United States Patent [19]

Shiraishi et al.

[11] Patent Number: 5,152,893
[45] Date of Patent: Oct. 6, 1992

[54] CERAMIC FILTER FOR MOLTEN METAL

[75] Inventors: Yukihisa Shiraishi; Tadahiro Yoshida, both of Ohmuta, Japan

[73] Assignee: Mitsui Mining & Smelting Co., Ltd., Tokyo, Japan

[21] Appl. No.: 815,430

[22] Filed: Dec. 31, 1991

[30] Foreign Application Priority Data

Jun. 27, 1991 [JP] Japan ................................. 3-181613

[51] Int. Cl.$^5$ ............................................. B01D 39/20
[52] U.S. Cl. ..................... 210/496; 210/509; 210/510.1
[58] Field of Search ................ 210/500.26, 500.25, 210/509, 510.1, 508, 496, 494.2

[56] References Cited

U.S. PATENT DOCUMENTS 4,697,632 10/1987 Lirones ........................... 210/496

FOREIGN PATENT DOCUMENTS 52-22327 6/1977 Japan .
2-34732 2/1990 Japan .

Primary Examiner—Frank Sever
Attorney, Agent, or Firm—Flynn, Thiel, Boutell & Tanis

[57] ABSTRACT

A ceramic filter used for filtering molten metal, particularly molten aluminum, made by sintering the composition comprising 90 parts by weight of electrofused alumina for an aggregate and 5 to 15 parts by weight of an inorganic binder. The inorganic binder comprises 5 to 15 wt % of $B_2O_3$, 15 to 50 wt % of MgO, 3 to 10 wt % of $SiO_2$ and the remainder $Al_2O_3$.

1 Claim, 1 Drawing Sheet

CERAMIC FILTER FOR MOLTEN METAL

BACKGROUND OF THE INVENTION

1) Field of the Invention

The present invention relates to a ceramic filter used for filtering off nonmetallic inclusions mixed in molten metal, particularly molten aluminum.

2) Description of the Prior Art

When aluminum (including aluminum alloy) is melted, various nonmetallic inclusions usually mixes in it. The inclusions are removed from molten aluminum by means of filters.

A ceramic filter used for this purpose is disclosed in Japanese Patent Provisional Publication gazette No. 22327/1977, which is made by sintering fused alumina for an aggregate and an inorganic binder containing 10 to 50 wt % of $SiO_2$ and 5 to 20 wt % of $B_2O_3$.

There is a problem with this filter that its constituents such as Ca and Si dissolve into molten aluminum while molten aluminum is passed through it. Though the amount of dissolution is very small, this problem is serious particularly to high purity aluminum.

Another type of ceramic filter which does not contain $SiO_2$ is proposed in Japanese Patent Provisional Publication gazette No. 34732/1990. The binder of this filter comprises 15 to 80 wt % of $B_2O_3$, 2 to 60 wt % of $Al_2O_3$, and 5 to 50 wt % of CaO or MgO or both of them. Though there is no problem of the dissolution of the constituents such as Si with this filter, it can break during use because of the lack of strength of the filter itself. Further, since this filter does not contain $SiO_2$, and in general the filters which do not contain $SiO_2$ have a poor wettability for molten aluminum, its permeability for molten aluminum is low, and the filtering capacity of this filter is not sufficient for practical use. The low permeability for molten aluminum also causes the rise of the initial head of molten aluminum (the height of the surface of molten aluminum when the molten aluminum is poured on the filter at the beginning of a filtering operation and begins to pass through the filter). Therefore, when conventional filters being used in an existing apparatus are replaced with this filter, the filtering apparatus sometimes must be modified so as to accommodate the rise of the initial head.

SUMMARY OF THE INVENTION

The object of the present invention is to provide an improved ceramic filter used for filtering molten metal, particularly molten aluminum which has a high filtering capability equal to that of conventional filters, does not cause the problem of contamination, and has an enough strength to endure practical use.

The present invention attains the above object by a ceramic filter for molten aluminum made by sintering the composition comprising 90 parts by weight of electrofused alumina particles for an aggregate material and 5 to 15 parts by weight of an inorganic binder, characterized by that the binder comprises 5 to 15 wt % of $B_2O_3$, 15 to 50 wt % of MgO, 3 to 10 wt % of $SiO_2$ and the remainder $Al_2O_3$.

This filter has been invented by closely examining the relationship between the $SiO_2$ content in the inorganic binder and the contamination of molten aluminum by the filter and the strength of the filter at the temperature at which the filter is used.

DETAILED DESCRIPTION OF THE PREFERRED EMBODIMENTS

Figure 1:
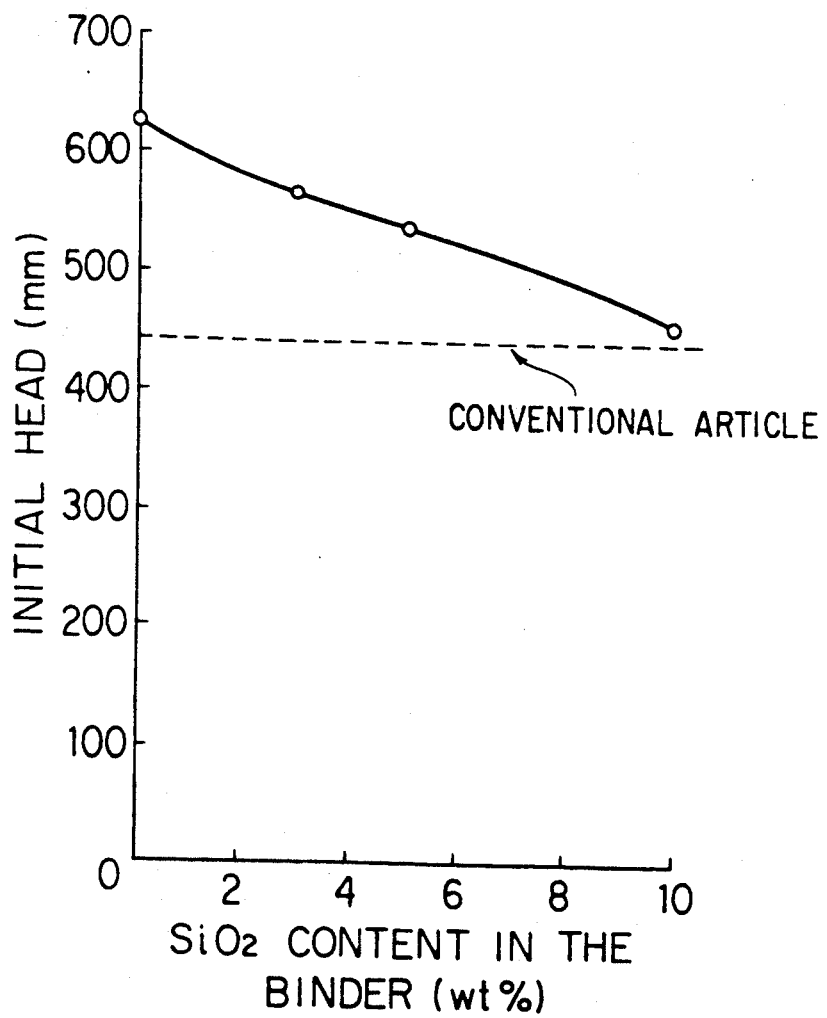
FIG. 1 shows the relationship between the $SiO_2$ content in the binder and the height of the initial head of molten aluminum.

In this invention, the amount of the inorganic binder is 5 to 15 parts by weight to 90 parts by weight of electrofused alumina for the aggregate. If the amount of the inorganic binder is smaller than 5 parts by weight, the strength of the filter is not sufficient; if it is greater than 15 parts by weight, the porosity of the filter obtained is too low and hence the filtering capacity is not sufficient for practical use, though the strength is adequate.

The inorganic binder of the the present invention comprises 5 to 15 wt % of $B_2O_3$, 15 to 50 wt % of MgO, 3 to 10 wt % of $SiO_2$ and the remainder $Al_2O_3$. The range of each constituent of the inorganic binder is determined by the following reason.

It is thought from experience that filters used for filtering molten aluminum must have the modulus of rupture larger than 30 kg/cm$^2$ at 800° C. and larger than 100 kg/cm$^2$ at room temperature. If the amount of $B_2O_3$ is smaller than 5 wt %, vitreous material formed in the binder is not sufficient and the strength of the filter at room temperature is too low. If the amount of $B_2O_3$ is larger than 15 wt %, the strength of the filter at room temperature and that at 800° C. are both too low, and the filter thus is not practically usable.

Addition of $SiO_2$ increases the modulus of rupture of the filter both at room temperature and at 800° C. However, if the amount of $SiO_2$ is smaller than 3 wt %, the filter obtained has a poor wettability for molten aluminum. The poor wettability causes the rise of the initial head of molten aluminum. It also decreases the filtering capacity through the lowering of the permeability for molten aluminum. If the amount of $SiO_2$ is larger than 10 wt %, the dissolution of si into molten aluminum increases and can cause the problem with the quality of filtered aluminum, particularly that of high purity aluminum.

The amount of MgO is determined so that the filter has a desirable strength. If the amount of MgO is smaller than 15 wt % or larger than 50 wt %, the strength of the filter is lower than the desirable value.

EXAMPLES

All examples were made by sintering 90 parts by weight of the aggregate, 10 parts by weight of the inorganic binder, and 5 parts by weight of a combustible material. No. 24 JISA abrasive perticles (electrofused alumina) was used for the aggregate and grain powder for the combustible material. The binder of each example was prepared by mixing $SiO_2$, $B_2O_3$, and MgO in the proportion as shown in Table 1.

The aggregate, inorganic binder, and combustible material were kneaded, molded, and sintered at a temperature within the range of 1,350° to 1,450° C. The samples thus obtained were tested on the modulus of rupture. This test was conducted by supporting each sample at two points with a span of 90 mm and applying a load to it at the middle point. The modulus of rupture at 800° C. was also measured by the same method after having placed the samples in an electric furnace and maintained them at 800° C. for 20 minutes. The test results are also shown in Table 1.

Samples 6 to 9 were further tested on the Si dissolution by putting the samples in molten 5056 aluminum at 750° C. for 7 days, stirring and leaving still repeatedly. The test results were shown in Table 2.

It is known from Tables 1 and 2 that, when the $SiO_2$ content is within the range of 3 to 10 wt %, the filter has a satisfactory modulus of rupture and, at the same time, the Si dissolution is so small that the contamination of molten aluminum can substantially reduced in comparison to conventional filters.

The relationship between the $SiO_2$ content and the height of the initial head of molten aluminum is shown in FIG. 1.

It is known from FIG. 1 that by addition of a small amount of $SiO_2$ the filter has the wettability for molten aluminum almost equal to that of conventional filters, and therefore can prevent the rise of the initial head of molten aluminum.

According to the present invention, as described above, a filter which has a filtering capacity equal to that of conventional filters, does not cause the problem of contamination, and has an enough strength to endure practical use, is obtained by properly selecting the $SiO_2$ content in the inorganic binder. Therefore conventional filters being used in an existing apparatus can be replaced with the filter of the present invention without modification of the apparatus and change of the operating conditions.

TABLE 1

| Sample No. | Composition of binder | | | | Modulus of Rupture (kg/cm$^2$) | |
| --- | --- | --- | --- | --- | --- | --- |
| | $Al_2O_3$ | $B_2O_3$ | MgO | $SiO_2$ | at Room Temp | at 800° C. |
| 1 | 50 | 3 | 42 | 5 | 58 | 48 |
| 2 | 50 | 5 | 40 | 5 | 110 | 45 |
| 3 | 50 | 15 | 30 | 5 | 120 | 44 |
| 4 | 50 | 18 | 27 | 5 | 71 | 12 |
| 5 | 50 | 10 | 39 | 1 | 85 | 30 |
| 6 | 50 | 10 | 37 | 3 | 100 | 32 |
| 7 | 50 | 10 | 35 | 5 | 130 | 35 |
| 8 | 50 | 10 | 30 | 10 | 139 | 42 |
| 9 | 50 | 10 | 25 | 15 | 155 | 67 |
| 10 | 25 | 10 | 60 | 5 | 45 | 22 |
| 11 | 45 | 10 | 40 | 5 | 133 | 35 |
| 12 | 55 | 10 | 30 | 5 | 129 | 37 |
| 13 | 75 | 10 | 10 | 5 | 52 | 25 |

TABLE 2

| Sample No. | Analyzed Si content (%) | Si dissolution (%) |
| --- | --- | --- |
| 6 | 0.049 | 0.001 |
| 7 | 0.049 | 0.001 |
| 8 | 0.050 | 0.002 |
| 9 | 0.085 | 0.037 |
| Conv. filter | 0.220 | 0.172 |
| Blank* | 0.048 | 0 |

*Blank indicates the analyzed Si content of the molten aluminum in which no samples were immersed.

What is claimed is:

1. A ceramic filter used for filtering molten metal made by sintering the composition comprising 90 parts by weight of electrofused alumina for an aggregate and 5 to 15 parts by weight of an inorganic binder, characterized by that the inorganic binder consisting essentially of $B_2O_3$, MgO, $SiO_2$ and $Al_2O_3$ in proportions sufficient to provide properties for filtering molten metal, including high filtering capacity equal to that of conventional filters, substantial preclusion of contamination and sufficient strength to endure practical use.

* * * * *